United States Patent
Kawai et al.

(10) Patent No.: US 9,637,025 B2
(45) Date of Patent: May 2, 2017

(54) CONTROL APPARATUS FOR VEHICLE MOTOR

(71) Applicant: TOYOTA JIDOSHA KABUSHIKI KAISHA, Toyota-shi, Aichi-ken (JP)

(72) Inventors: Takashi Kawai, Gotemba (JP); Takuro Kumada, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/760,544

(22) PCT Filed: Jan. 18, 2013

(86) PCT No.: PCT/JP2013/050986
§ 371 (c)(1),
(2) Date: Jul. 13, 2015

(87) PCT Pub. No.: WO2014/112109
PCT Pub. Date: Jul. 24, 2014

(65) Prior Publication Data
US 2015/0360583 A1 Dec. 17, 2015

(51) Int. Cl.
*B60L 15/20* (2006.01)
*H02P 5/747* (2006.01)
(Continued)

(52) U.S. Cl.
CPC ......... *B60L 15/2045* (2013.01); *B60L 11/126* (2013.01); *B60L 11/14* (2013.01);
(Continued)

(58) Field of Classification Search
CPC .................................................. B60L 15/2045
See application file for complete search history.

(56) References Cited

U.S. PATENT DOCUMENTS 5,646,841 A * 7/1997 Suzuki ................... F16H 59/44
303/146
8,260,511 B2 * 9/2012 Heap ................... B60W 30/188
701/54
(Continued)

FOREIGN PATENT DOCUMENTS

JP H05-3694 A 1/1993
JP 2003-244874 A 8/2003
(Continued)

*Primary Examiner* — Thomas Tarcza
*Assistant Examiner* — Michael Berns
(74) *Attorney, Agent, or Firm* — Andrews Kurth Kenyon LLP

(57) ABSTRACT

A control apparatus for a vehicle motor is provided with: a characteristic switching device configured to switch a characteristic of a motor between a first characteristic in which the output upper limit is first predetermined torque and a second characteristic in which the output upper limit is second predetermined torque, which is smaller than the first predetermined torque; a characteristic determining device configured to determine whether the characteristic of the motor is the first characteristic or the second characteristic; and a characteristic controlling device configured to control the characteristic switching device to switch the characteristic of the motor to the first characteristic and to start the motor with the first characteristic at a next start of the driven body if it is determined that the characteristic of the motor is not the first characteristic.

7 Claims, 10 Drawing Sheets

(51) Int. Cl.
*B60L 11/12* (2006.01)
*B60L 11/14* (2006.01)

(52) U.S. Cl.
CPC .......... *B60L 15/2054* (2013.01); *H02P 5/747* (2013.01); *B60L 2240/423* (2013.01); *B60L 2250/26* (2013.01); *B60L 2260/26* (2013.01); *Y02T 10/6217* (2013.01); *Y02T 10/645* (2013.01); *Y02T 10/7077* (2013.01); *Y02T 10/72* (2013.01); *Y02T 10/7283* (2013.01)

(56) References Cited

U.S. PATENT DOCUMENTS 8,905,884 B2 * 12/2014 Noguchi .............. B60K 7/0007
475/150
8,972,153 B2 * 3/2015 Sawada ............... F02N 11/0837
123/179.4

FOREIGN PATENT DOCUMENTS

| | | |
|---|---|---|
| JP | 2007-244060 A | 9/2007 |
| JP | 2008-148490 A | 6/2008 |
| JP | 2011-030341 A | 2/2011 |
| JP | 2011-050150 A | 3/2011 |

* cited by examiner

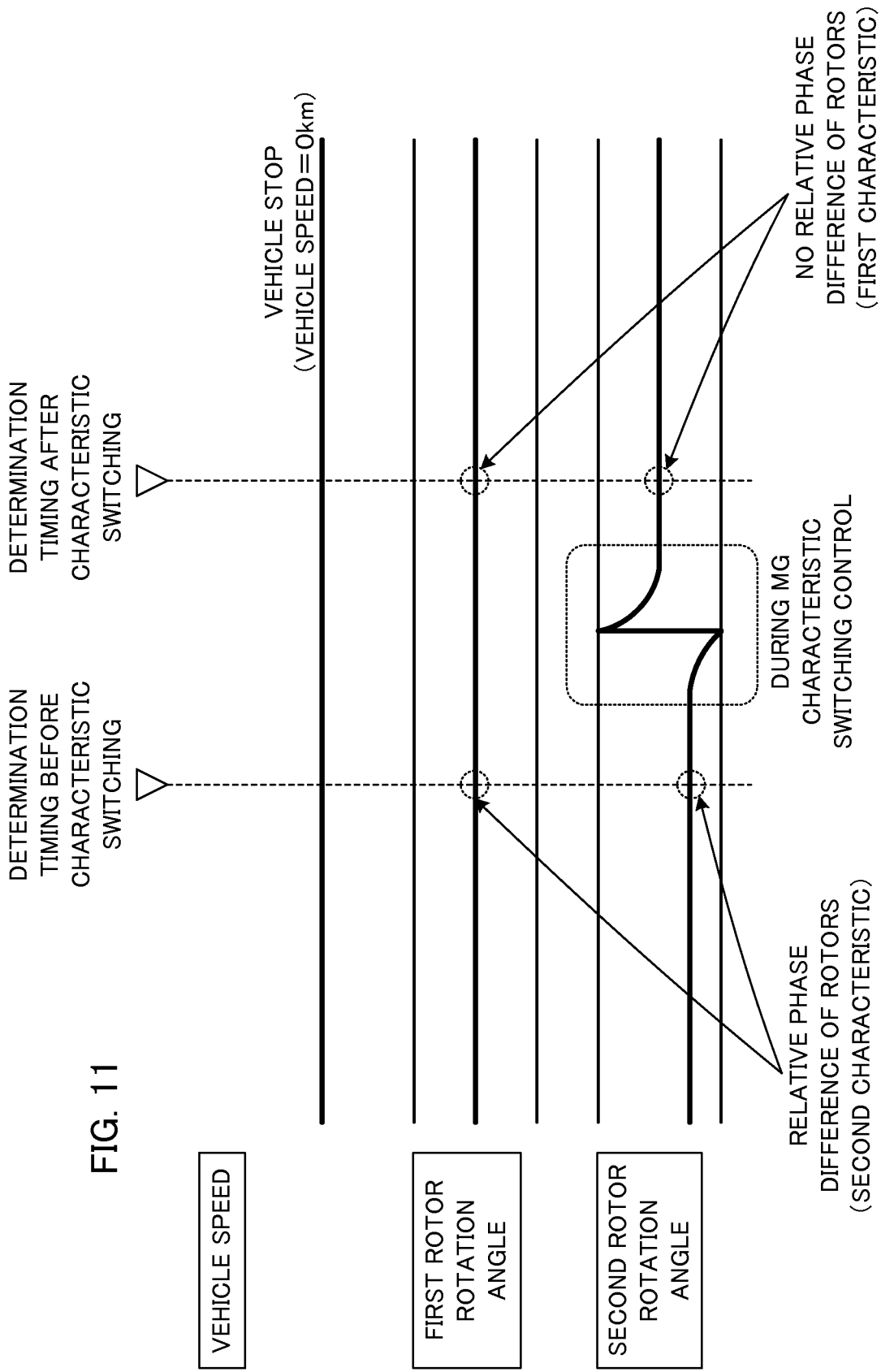

CONTROL APPARATUS FOR VEHICLE MOTOR

CROSS-REFERENCE TO RELATED APPLICATION

This is a national phase application based on the PCT International Patent Application No. PCT/JP2013/050986 filed Jan. 18, 2013, the entire contents of which are incorporated herein by reference.

TECHNICAL FIELD

The present invention relates to a control apparatus for a vehicle motor, configured to control operation of a motor mounted on a vehicle such as, for example, an automobile.

BACKGROUND ART

As this type of motor, there is known a motor configured to switch between a plurality of characteristics to be driven. For example, Patent Literatures 1 and 2 disclose a proposed technology in which varying a relative phase of two rotors divided in a rotating shaft direction makes it possible to change between characteristics. Moreover, Patent Literature 3 discloses a proposed technology in which varying a relative phase of two rotors divided in a circumferential direction makes it possible to change between the characteristics. Furthermore, Patent Literature 3 discloses a proposed technology in which selectively switching between two types of winding wires to be used makes it possible to change between the characteristics.

CITATION LIST

Patent Literature

Patent Literature 1: Japanese Patent Application Laid Open No. 2011-030341
Patent Literature 2: Japanese Patent Application Laid Open No. 2003-244874
Patent Literature 3: Japanese Patent Application Laid Open No. 2007-244060
Patent Literature 4: Japanese Patent Application Laid Open No. 2011-050150

SUMMARY OF INVENTION

Technical Problem

As described above, if the motor can be driven by switching between the plurality of characteristics, it is possible to realize a highly efficient operating state according to circumstances. Specifically, electric power consumed by driving can be effectively suppressed by switching between the characteristics in circumstances in which relatively large torque is required (e.g. at the start of a vehicle) and in circumstances in which only relatively small torque is required (e.g. during high-speed running).

There is, however, a possibility that the aforementioned characteristic switching control cannot be performed due to an unexpected failure or the like. In other words, there can such circumstances in which the characteristic of the motor is fixed to one characteristic.

Here, in particular, in the vehicle motor, due to the nature thereof, it is required at the minimum to maintain a state in which the vehicle can run even if a defect occurs. However, for example, if the switching control cannot be performed in a state in which it is switched to such a characteristic that allows output torque to be limited, insufficient torque causes unexpected vehicle behavior, which possibly not only hinders appropriate running but also makes it hard to ensure safety.

As described above, the technologies described in the Patent Literatures 1 to 4 have such a technical problem that the fixed characteristic possibly causes a further disadvantage if the characteristic switching control cannot be performed.

It is therefore an object of the present invention to provide a control apparatus for a vehicle motor, in which appropriate running can be realized even if the characteristic switching control cannot be performed.

Solution to Problem

The above object of the present invention can be achieved by a control apparatus for a vehicle motor, configured to control a motor that can realize a plurality of characteristics in which output upper limits of torque are different from each other, said control apparatus for the vehicle motor comprising: a characteristic switching device configured to switch a characteristic of the motor between a first characteristic in which the output upper limit is first predetermined torque and a second characteristic in which the output upper limit is second predetermined torque, which is smaller than the first predetermined torque; a characteristic determining device configured to determine whether the characteristic of the motor is the first characteristic or the second characteristic; and a characteristic controlling device configured to allow said characteristic determining device to determine whether or not the characteristic of the motor is the first characteristic if a driven body driven by the motor is stopped, and configured to control said characteristic switching device to switch the characteristic of the motor to the first characteristic and to start the motor with the first characteristic at a next start of the driven body if it is determined that the characteristic of the motor is not the first characteristic.

The motor according to the present invention is configured as an electric motor generator such as, for example, a motor generator, and is mounted on a vehicle such as a hybrid vehicle and an electric vehicle, and functions as a power source of the vehicle. In particular, the motor according to the present invention can realize the plurality of characteristics in which the output upper limits of torque are different from each other. As one example of the characteristics, for example, magnetic field characteristics of the motor are exemplified. In a motor having rotors divided in a circumferential direction or in a shaft direction, changing a relative phase of the rotors makes it possible to realize the characteristic switching. Alternatively, in a motor having a rotor(s) provided with a plurality of winding wires, switching between the winding wires to be used also makes it possible to switch between the characteristics. As a method of switching between the characteristics of the motor, another known method can be also used.

The control apparatus for the vehicle motor according to the present invention is an apparatus configured to perform control of the aforementioned motor, and can adopt forms of various computer systems such as various processing units like a single or a plurality of electronic control units (ECUs), various controllers, or microcomputer apparatuses, which can include, as occasion demands, one or a plurality of central processing units (CPUs), micro processing units (MPUs), various processors, or various controllers, or which can further include various storage devices such as a read only memory (ROM), a random access memory (RAM), a buffer memory, or a flash memory, and the like.

In operation of the control apparatus for the vehicle motor according to the present invention, the characteristic of the motor is switched between the plurality of characteristics by the characteristic switching device. Specifically, the characteristic switching device switches the characteristic of the motor between the first characteristic in which the output upper limit is the first predetermined torque and the second characteristic in which the output upper limit is the second predetermined torque. Here, the second predetermined torque has a value that is smaller than that of the first predetermined torque. Thus, it can be said that the second characteristic in which the second predetermined torque is the output upper limit is a characteristic in which the torque that can be outputted is smaller than that of the first characteristic in which the first predetermined torque is the output upper limit (i.e. a characteristic in which the output torque is limited).

By switching between the characteristics in which the output upper limits of the torque are different from each other as described above, efficient operation of the motor can be realized. For example, at the start of the vehicle or in similar cases, it is required to output relatively large torque. Therefore, preferable running of the vehicle can be realized by switching the characteristic of the motor to the first characteristic in which the output upper limit of the torque is larger. On the other hand, during high-speed running of the vehicle, high number of revolutions is required, while the torque is not required so much. Therefore, the efficient operation with less power consumption can be realized by switching the characteristic of the motor to the second characteristic in which the output upper limit is smaller.

In the present invention, moreover, it is determined by the characteristic determining device whether the characteristic of the motor is the first characteristic or the second characteristic. In the characteristic determining device, the characteristic of the motor is determined regularly with a predetermined period, for example, during the operation of the motor, or at predetermined timing such as immediately after implementation of characteristic switching control. This makes it possible to accurately know a present characteristic of the motor, which is appropriately switched by the characteristic switching device, and to perform appropriate control according to the characteristic. The characteristic can be determined by detecting a rotation angle of a rotor(s), for example, in a motor in which the phase of the rotor(s) is changed to change the characteristic.

Here, in particular, the aforementioned characteristic determining device is allowed by the characteristic controlling device to determine whether or not the characteristic of the motor is the first characteristic if the driven body driven by the motor is stopped (e.g. if the vehicle is stopped, or if only the operation of the motor is stopped, or in similar cases). In other words, in the characteristic determining device, the characteristic determination in the case of the stop of the motor is performed, in addition to the characteristic determination for performing normal characteristic switching control during the operation of the motor.

Then, as a result of the determination by the characteristic determining device, if it is determined that the characteristic of the motor when the driven body is stopped is not the first characteristic, the characteristic switching device is controlled by the characteristic controlling device to switch the characteristic of the motor to the first characteristic. If it is determined that the characteristic of the motor is already the first characteristic, the characteristic of the motor may not be switched. As a result of such control, the characteristic of the motor when the driven body is stopped is set to be in a state of the first characteristic, regardless of the characteristic immediately before the stop.

Moreover, the motor set to have the first characteristic at the stop of the driven body is started with the first characteristic at the next start of the driven body. In other words, the characteristic of the motor set to the first characteristic at the stop is maintained until the next start, and the motor is started with the first characteristic.

Here, the switching of the characteristic of the motor by the characteristic switching device cannot be performed in some cases due to an unexpected failure or the like. In this case, since the characteristic of the motor is fixed to one characteristic, the efficient operation by the characteristic switching as described above is hardly performed. Moreover, if the characteristic of the motor is fixed to the second characteristic, the output of the torque is limited to the relatively small second predetermined torque, and there is thus a possibility that the vehicle cannot preferably run. Specifically, there is a possibility that the vehicle cannot be appropriately started from a stop state, or that acceleration/deceleration desired by a driver cannot be realized. Moreover, unstable behavior of the vehicle possibly makes it hard to ensure safety.

Particularly in the present invention, however, as described above, the characteristic of the motor is set to the first characteristic if the driven body driven by the motor is stopped, and the motor is started with the first characteristic at the next start. Thus, even if the characteristic switching cannot be performed during the stop of the driven body, the motor can output relatively large torque. It is therefore possible to preferably avoid the disadvantage caused by the insufficient output torque as described above.

From the viewpoint of avoiding the disadvantage as described above, the first predetermined torque, which is the output upper limit of the first characteristic, preferably has as a large value as possible. However, as long as the first predetermined torque, which is the output upper limit of the first characteristic, is larger than the second predetermined torque, which is the output upper limit of the second characteristic, to some extent, the aforementioned effect is properly exerted regardless of the magnitude of the first predetermined torque.

Here, the case where the characteristic is switched between the first characteristic and the second characteristic is explained; however, the present invention is effective even in a case where switching to another characteristic is realized. For example, even if it can be switched to a third characteristic in which third predetermined torque, which is smaller than the first predetermined torque and is larger than the second predetermined torque, is set as the output upper limit, or a fourth characteristic in which fourth determined torque, which is smaller than the second predetermined torque, is set as the output upper limit, if it is switched to the first characteristic (i.e. the characteristic in which relatively large torque can be outputted) in the case of the stop of the driven body, then, the disadvantage caused by the insufficient torque can be preferably avoided.

As explained above, according to the control apparatus for the vehicle motor of the present invention, appropriate running can be realized even if the characteristic switching control of the motor cannot be performed. Moreover, it can be said that such an effect is extremely useful in application to the vehicle in which the minimum running is required even in the case of a failure.

In one aspect of the control apparatus for the vehicle motor according to the present invention, wherein the first predetermined torque is maximum torque that can be outputted by the motor.

According to this aspect, the first characteristic is set as the characteristic in which the maximum torque that can be outputted by the motor can be outputted. Thus, even if the characteristic switching cannot be performed during the stop, the maximum torque can be outputted from the motor in which it is switched to the first characteristic in advance. In other words, even if the characteristic is fixed due to a failure or the like, the output torque is not limited. It is therefore possible to certainly avoid the disadvantage caused by the insufficient torque.

In another aspect of the control apparatus for the vehicle motor according to the present invention, wherein said characteristic controlling device allows said characteristic determining device to determine whether or not the characteristic of the motor is the first characteristic if the driven body is stopped for a predetermined period or more.

According to this aspect, the determination of the characteristic of the motor by the characteristic determining device instructed by the characteristic controlling device is not always performed if the driven body is stopped, but is performed only if the driven body is stopped for the predetermined period or more. Thus, even in the case of the stop of the driven body, if it is not stopped for the predetermined period or more, the characteristic of the motor is not switched to the first characteristic.

Here, the "predetermined period" is a period set in advance as a period in which a possibility of not performing the characteristic switching control of the motor during the stop increases to a certain degree, and is obtained and set, for example, theoretically, experimentally, or experientially. According to the study of the present inventors, it has been found that a defect related to the characteristic switching control tends to occur more often as the driven body is stopped for a longer time. Thus, if the characteristic determination and the switching control to the first characteristic are performed with the predetermined period as a threshold value, it is then possible to efficiently avoid the defect, in comparison with a case where the aforementioned control is performed at each time of the stop.

In another aspect of the control apparatus for the vehicle motor according to the present invention, wherein said characteristic determining device determines that the characteristic of the motor is the first characteristic if the motor outputs stop torque for stopping the driven body.

The motor according to the present invention outputs the stop torque to stop the driven body in some cases, and the stop torque is required to be relatively large torque due to the nature thereof. Thus, the motor that outputs the stop torque is set to have the first characteristic in which the relatively large torque can be outputted. Therefore, if the motor outputs the stop torque to stop the driven body, it can be determined that the characteristic of the motor is the first characteristic even without detection of another parameter (e.g. the rotation angle of a rotor(s)) or the like. In other words, even if a process for determining the characteristic of the motor is not separately performed, the characteristic of the motor can be determined depending on whether or not the motor outputs the stop torque. As a result, the characteristic of the motor can be determined, extremely easily and accurately.

In another aspect of the control apparatus for the vehicle motor according to the present invention, wherein said characteristic controlling device allows said characteristic determining device to determine whether or not the characteristic of the motor is the first characteristic after a command of system off of a vehicle on which the motor is mounted.

The vehicle according to the present invention is configured in such a manner that various controls of the entire vehicle such as running can be performed by a system of the vehicle. Thus, if the system of the vehicle is set to OFF, the driven body by the motor is also certainly stopped. Therefore, if the characteristic of the motor is determined after the command of the system off of the vehicle, determination timing can be appropriately set, and the switching to the first characteristic can be preferably performed. Specifically, the switching to the first characteristic can be performed until the system is actually set to be OFF after the command of the system off.

After the switching to the first characteristic during the system off, it is required to maintain the first characteristic until next system on. Thus, the motor according to this aspect is preferably a motor that does not need electric power to maintain the characteristic. As the motor that does not need electric power to maintain the characteristic, for example, there are listed a rotor of a variable magnetic force type by electric current control, and a rotor of a rotor division type, or the like.

Moreover, the system of the vehicle is set to be ON, for example, by a key operation of the driver, and is set to be OFF if the driver stops the vehicle and leaves from the vehicle. Thus, if the system of the vehicle is set to be OFF, the driven body of the motor is considered to be stopped for a relatively long time. Thus, if the system of the vehicle is set to be OFF, it can be said to be in a stop state in which there is a high possibility of not performing the characteristic switching control of the motor. Therefore, if the characteristic of the motor is determined when the system of the vehicle is set to be OFF, the determination timing can be appropriately set, and the switching to the first characteristic can be preferably performed.

In another aspect of the control apparatus for the vehicle motor according to the present invention, wherein the motor is provided in such a manner that the motor corresponds to a drive shaft of a vehicle on which the motor is mounted, in number of revolutions, and said characteristic controlling device allows said characteristic determining device to determine whether or not the characteristic of the motor is the first characteristic if a speed of the vehicle becomes zero.

The motor according to this aspect is provided, for example, as a motor that directly outputs torque to the drive shaft of the vehicle (more specifically, a motor that directly outputs power for running the vehicle, etc.), and the number of revolutions of the motor and the number of revolutions of the drive shaft correspond to each other. The term "correspond" herein means a state that satisfies a relation in which the number of revolutions of the motor also becomes zero (i.e. the driven body of the motor is stopped) if the number of revolutions of the drive shaft becomes zero. For example, the term "correspond" does not require an accurate correspondence relation in which the number of revolutions of the motor can be accurately calculated from the number of revolutions of the drive shaft.

Here, if the speed of the vehicle becomes zero, the number of revolutions of the drive shaft of the vehicle can be also estimated to be zero. Thus, the number of revolutions of the motor corresponding to the number of revolutions of the drive shaft can be also estimated to be zero. Thus, in this aspect, if the speed of the vehicle becomes zero, it is determined whether or not the characteristic of the motor is the first characteristic, as per an instruction from the characteristic controlling device. In this manner, timing of stopping the driven body of the motor can be appropriately determined, and the characteristic of the motor can be determined at the appropriately timing. It is therefore possible to switch to the first characteristic.

In another aspect of the control apparatus for the vehicle motor according to the present invention, wherein the motor is provided in such a manner that the motor corresponds to an internal combustion engine of a vehicle on which the motor is mounted, in number of revolutions, and said characteristic controlling device allows said characteristic determining device to determine whether or not the characteristic of the motor is the first characteristic if the number of revolutions of the internal combustion engine becomes zero.

The motor according to this aspect is provided, for example, as a motor that directly outputs torque to the internal combustion engine of the vehicle (more specifically, a motor that outputs torque for starting the internal combustion engine and that regenerates power outputted form the internal combustion engine, etc.), and the number of revolutions of the motor and the number of revolutions of the internal combustion engine correspond to each other. The term "correspond" herein means a state that satisfies a relation in which the number of revolutions of the motor also becomes zero (i.e. the driven body of the motor is stopped) if the number of revolutions of the internal combustion engine becomes zero. For example, the term "correspond" does not require an accurate correspondence relation in which the number of revolutions of the motor can be accurately calculated from the number of revolutions of the internal combustion engine.

According to the aforementioned configuration, if the number of revolutions of the internal combustion engine becomes zero, the number of revolutions of the motor, which corresponds to the internal combustion engine in the number of revolutions, can be also estimated to be zero. Thus, in this aspect, if the number of revolutions of the internal combustion engine becomes zero, it is determined whether or not the characteristic of the motor is the first characteristic, as per an instruction from the characteristic controlling device. In this manner, the timing of stopping the driven body of the motor can be appropriately determined, and the characteristic of the motor can be determined at the appropriately timing. It is therefore possible to switch to the first characteristic.

The operation and other advantages of the present invention will become more apparent from an embodiment explained below.

BRIEF DESCRIPTION OF DRAWINGS

FIG. 11 is a time chart illustrating the operation when the characteristic of the motor generator is switched from the second characteristic to the first characteristic.

DESCRIPTION OF EMBODIMENT

Hereinafter, an embodiment of the present invention will be explained with reference to the drawings.

<Configuration of Vehicle>

Figure 1:
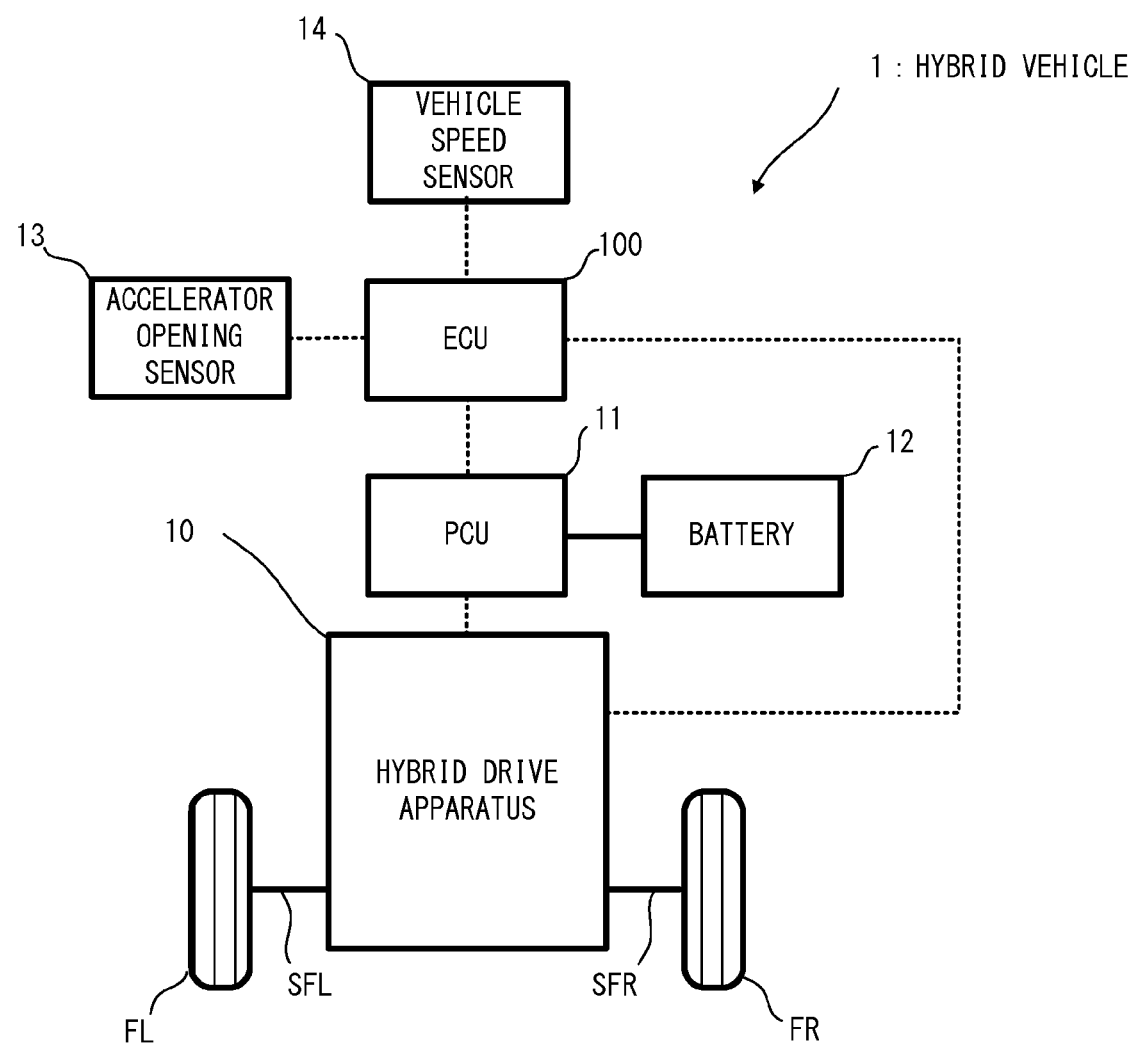
FIG. 1 is a schematic diagram illustrating an entire configuration of a vehicle on which a control apparatus for a vehicle motor according to an embodiment is mounted.

Firstly, an entire configuration of a vehicle on which a control apparatus for a vehicle motor according to the embodiment is mounted will be explained with reference to FIG. 1. FIG. 1 is a schematic diagram illustrating the entire configuration of the vehicle on which the control apparatus for the vehicle motor according to the embodiment is mounted.

In FIG. 1, a vehicle 1 according to the embodiment is a so-called hybrid vehicle, which is provided with a hybrid drive apparatus 10, a power control unit (PCU) 11, a battery 12, an accelerator opening sensor 13, a vehicle speed sensor 14, and an ECU 100.

The ECU 100 is an electronic control unit, which is provided with a central processing unit (CPU), a read only memory (ROM), a random access memory (RAM), and the like, and which is configured to control operation of each unit of the hybrid vehicle 1. The ECU 100 is configured to perform various controls in the hybrid vehicle 1, in accordance with a control program stored, for example, in the ROM or the like. The ECU 100 also functions as one example of the "control apparatus for the vehicle motor" of the present invention.

The PCU 11 converts direct current (DC) power extracted from the battery 12 to alternating current (AC) power, and supplies it to each of a motor generator MG1 and a motor generator MG2 described later. Moreover, the PCU 11 includes a not-illustrated inverter(s) configured to convert AC power generated by the motor generator MG1 and the motor generator MG2 to DC power, and to supply it to the battery 12. In other words, the PCU 11 is a power control unit configured to control input/output of electric power between the battery 12 and each motor generator, or input/output of electric power between the motor generators (i.e. in this case, electric power is transmitted and received between the motor generators without through the battery 12). The PCU 11 is electrically connected to the ECU 100, and operation thereof is controlled by the ECU 100.

The battery 12 function as an electric power supply associated with electric power for power running of the motor generator MG1 and the motor generator MG2. The battery 12 is chargeable, and a power storage amount or state of charge (SOC) thereof can be detected on the ECU 100 or the like.

The accelerator opening sensor 13 is a sensor configured to detect an accelerator opening degree, which is a manipulated variable or operation amount of a not-illustrated accelerator pedal of the hybrid vehicle 1. The accelerator opening sensor 13 is electrically connected to the ECU 100, and the detected accelerator opening degree is referred to by the ECU 100 with a regular or irregular period.

The vehicle speed sensor 14 is a sensor configured to detect a vehicle speed of the hybrid vehicle 1. The vehicle speed sensor 14 is electrically connected to the ECU 100, and the detected vehicle speed is referred to by the ECU 100 with a regular or irregular period.

Figure 2:
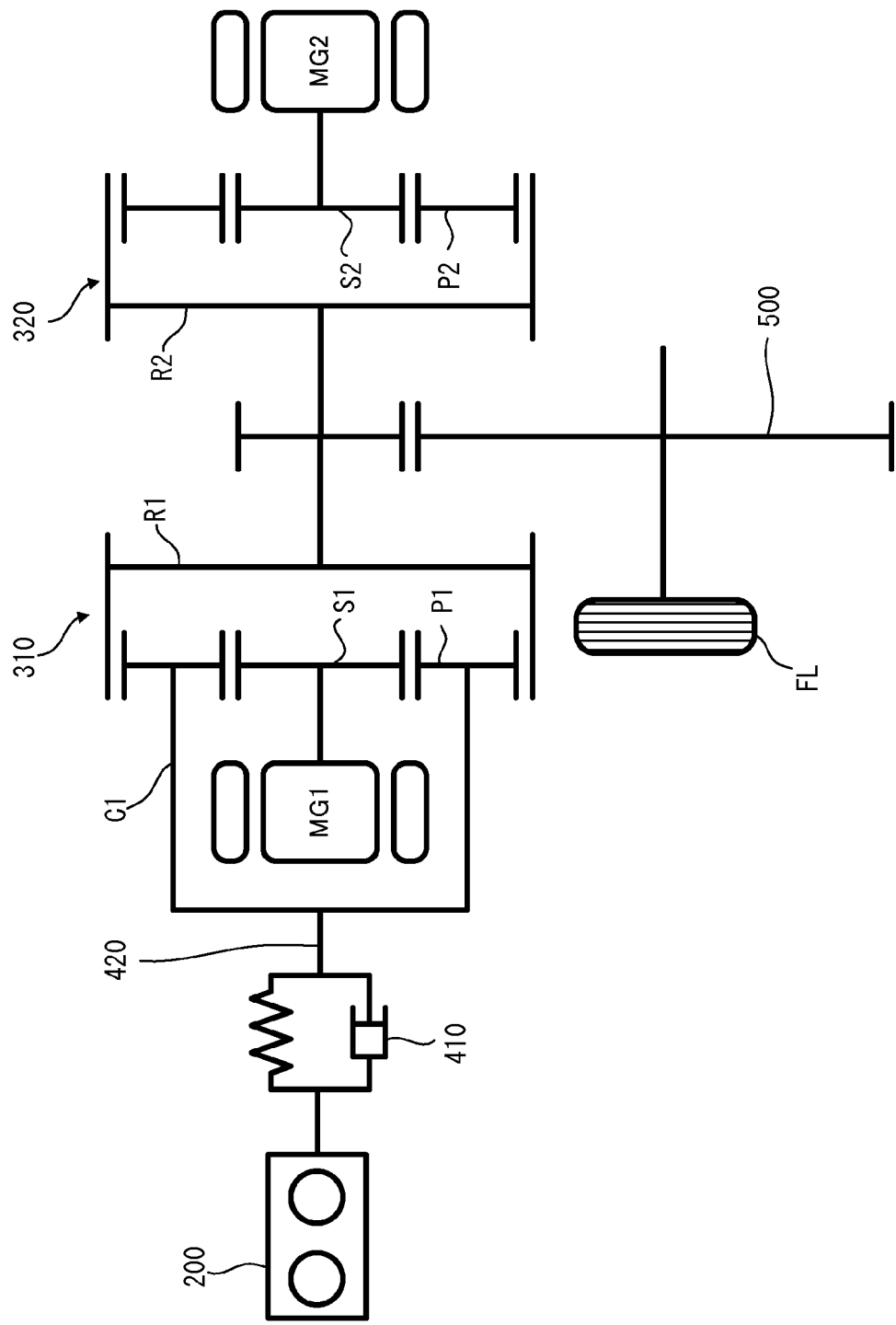
FIG. 2 is a schematic block diagram conceptually illustrating a configuration of a hybrid drive apparatus.

The hybrid drive apparatus 10 is a power unit that functions as a power train of the hybrid vehicle 1. Now, with reference to FIG. 2, a detailed configuration of the hybrid drive apparatus 10 will be explained. FIG. 2 is a schematic block diagram conceptually illustrating the configuration of the hybrid drive apparatus according to the embodiment.

In FIG. 2, the hybrid drive apparatus 10 is provided mainly with an engine 200, a MG1-side power transmission mechanism 310, a MG2-side power transmission mechanism 320, a damper 410, the motor generator MG1 (hereinafter abbreviated as "MG1" as occasion demands), the motor generator MG2 (hereinafter abbreviated as "MG2" as occasion demands), an input shaft 420, and a drive shaft 500.

The engine 200 is one example of the "internal combustion engine" of the present invention, and is configured to function as a main power source of the hybrid vehicle 1. The engine 200 is an engine that uses as fuel, for example, gasoline, light oil, alcohol fuel, or the like. The engine 200 is configured to enable combustion of an air-fuel mixture via an ignition operation by an ignition apparatus in which a part of a spark plug is exposed in a combustion chamber within a cylinder, and to convert reciprocating motion of a piston generated according to explosive force caused by the combustion into rotary motion of a crankshaft via a connecting rod.

In the vicinity of the crankshaft, there is disposed a crank position sensor configured to detect a rotational position (i.e. a crank angle) of the crankshaft. The crank position sensor is electrically connected to the ECU 100, and the ECU 100 is configured to calculate number of revolutions of the engine 200 on the basis of a crank angle signal outputted from the crank position sensor.

The engine 200 is configured to output power to the MG1-side power transmission mechanism 310 via the damper 410 and the input shaft 420.

The MG1-side power transmission mechanism 310 is provided with: a sun gear S1 disposed in a central part; a ring gear R1 concentrically disposed on an outer circumference of the sun gear S1; a plurality of pinion gears P1 disposed between the sun gear S1 and the ring gear R1, the pinion gears P1 revolving while rotating on the outer circumference of the sun gear S1; and a carrier C1 pivotally supporting rotating shafts of the respective pinion gears.

The sun gear S1 is coupled with a rotor(s) of the MG1 via a sun gear shaft. The ring gear R1 is coupled with the drive shaft 500. Moreover, the carrier C1 is coupled with the input shaft 420 of the engine 200.

The MG2-side power transmission mechanism 320 is provided with: a sun gear S2 disposed in a central part; a ring gear R2 concentrically disposed on an outer circumference of the sun gear S2; and a plurality of pinion gears P2 disposed between the sun gear S2 and the ring gear R2, the pinion gears P2 revolving while rotating on the outer circumference of the sun gear S2.

The sun gear S2 is coupled with a rotor(s) of the MG2 via a sun gear shaft. Moreover, the ring gear R2 is coupled with the drive shaft 500.

The motor generator MG1 is an electric motor generator provided with a power-running function for converting electric energy into kinetic energy and a regenerative function for converting kinetic energy into electric energy. The motor generator MG2 is an electric motor generator provided with the power running function for converting electric energy into kinetic energy and the regenerative function for converting kinetic energy into electric energy, as in the motor generator MG1.

Each of the motor generators MG1 and MG2 is configured, for example, as a synchronous motor generator, and is provided with a rotor(s) having a plurality of permanent magnets on an outer circumferential surface, and a stator around which a three-phase coil for forming a rotating magnetic field is wound. The motor generators, however, may have another configuration. The motor generator MG1 and the motor generator MG2 are configured as one example of the "motor" according to the present invention.

Hereinafter, if the motor generator MG1 and the motor generator MG2 are used for explanation without distinction, they will be simply referred to as the MG in some cases.

The drive shaft 500 is one example of the "drive shaft" of the present invention, and is coupled with drive shafts SFR and SFL (refer to FIG. 1) that respectively drive a right front wheel FR and a left front wheel FL, which are drive wheels of the hybrid vehicle 1.

In the embodiment, the hybrid vehicle 1 is exemplified and explained as one example of the vehicle according to the present invention; however, any vehicle that is provided with the motor (i.e. the motor generator MG) could be used even if the vehicle is other than the hybrid vehicle. For example, even an electric vehicle that is not provided with the engine 200 could be one example of the vehicle according to the present invention.

<Characteristics of Motor>

Figure 3:
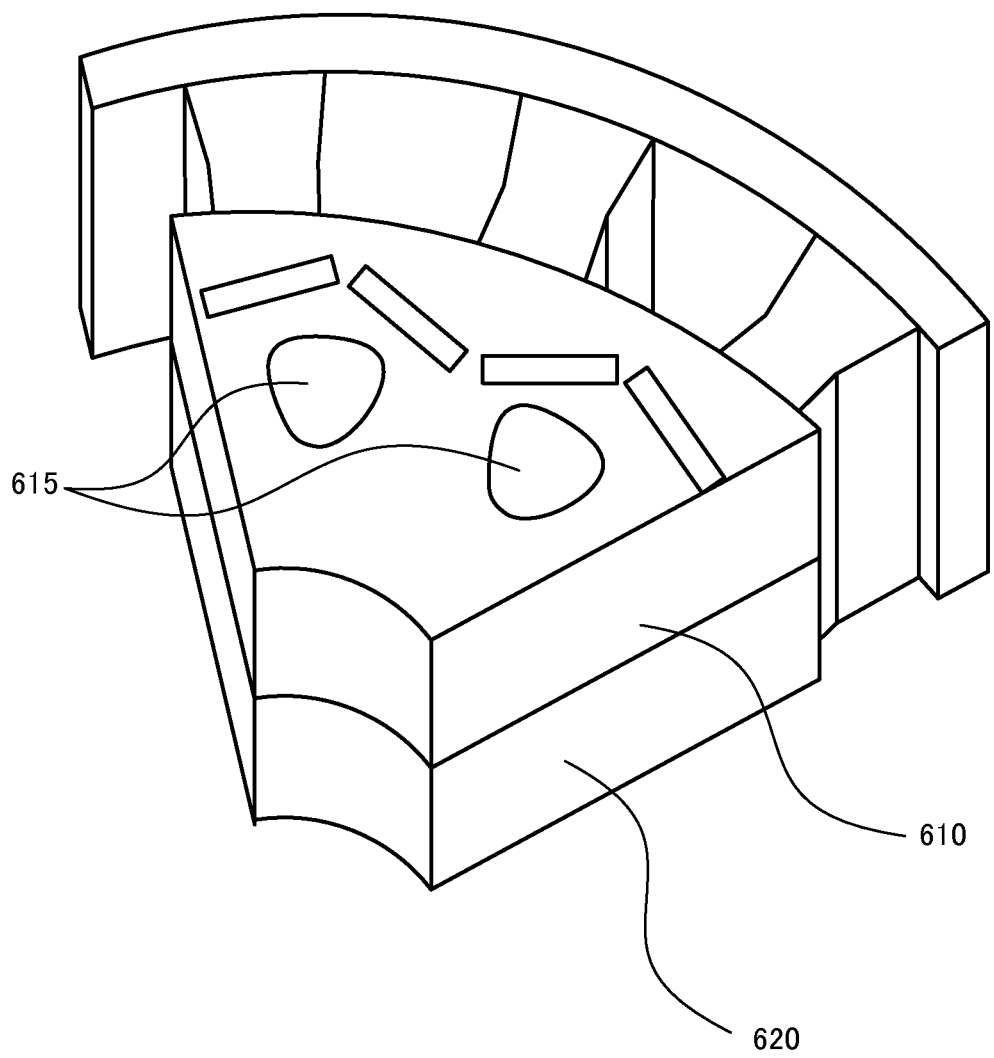
FIG. 3 is an enlarged cross sectional view illustrating a configuration of rotors during a first characteristic.
Figure 4:
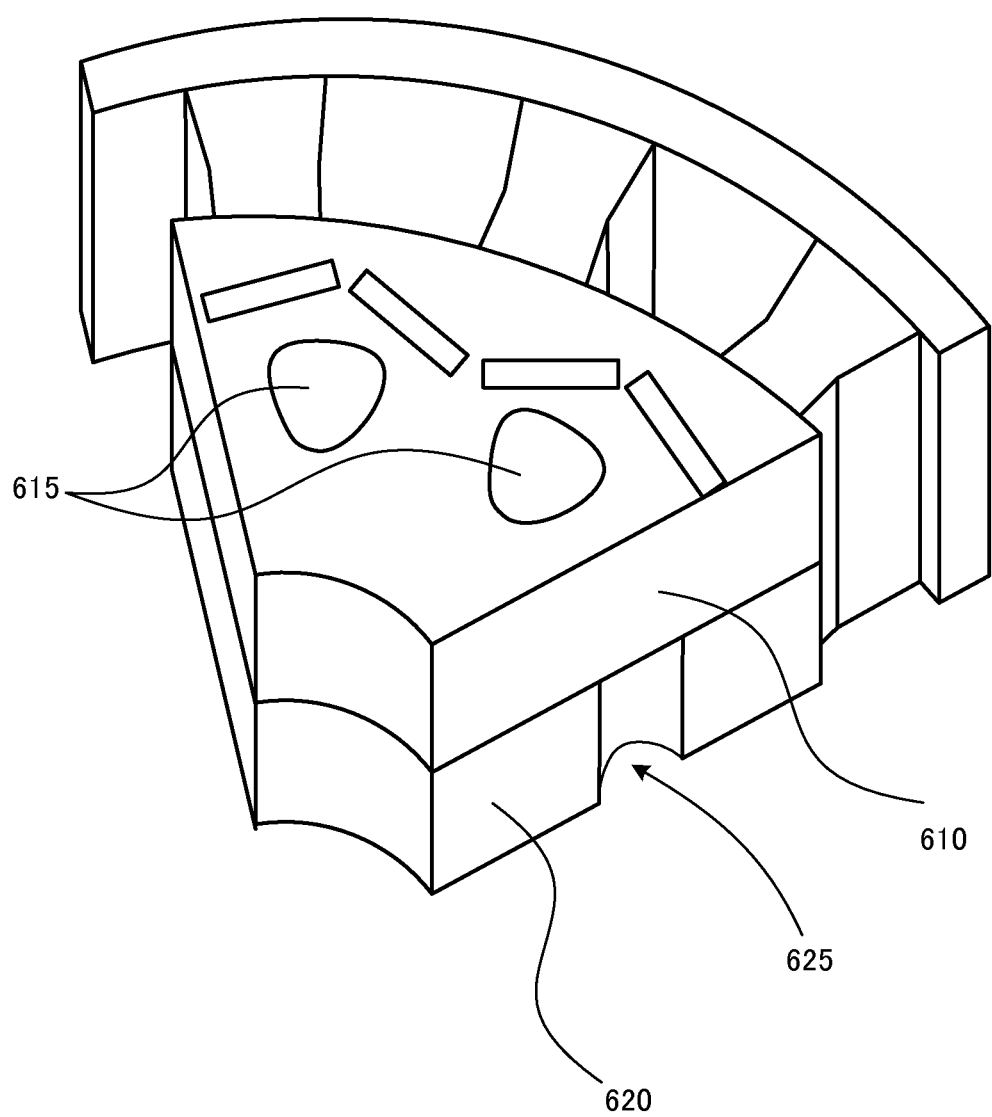
FIG. 4 is an enlarged cross sectional view illustrating a configuration of the rotors during a second characteristic.
Figure 5:
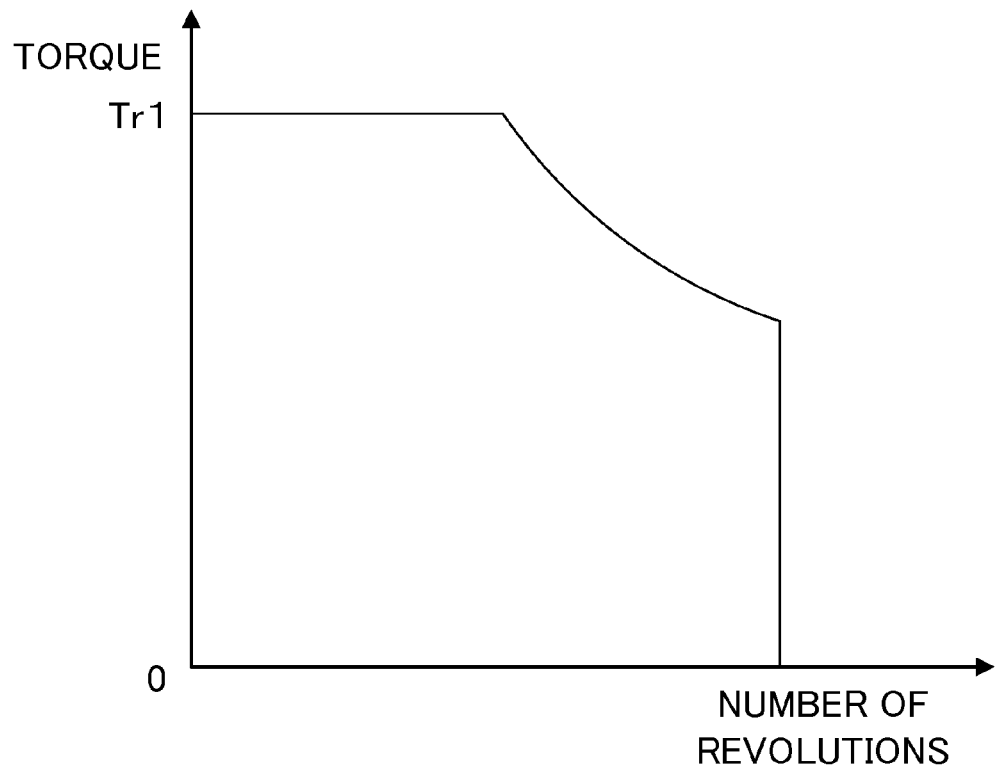
FIG. 5 is a graph illustrating a relation between torque and number of revolutions of a motor generator considered to have the first characteristic.
Figure 6:
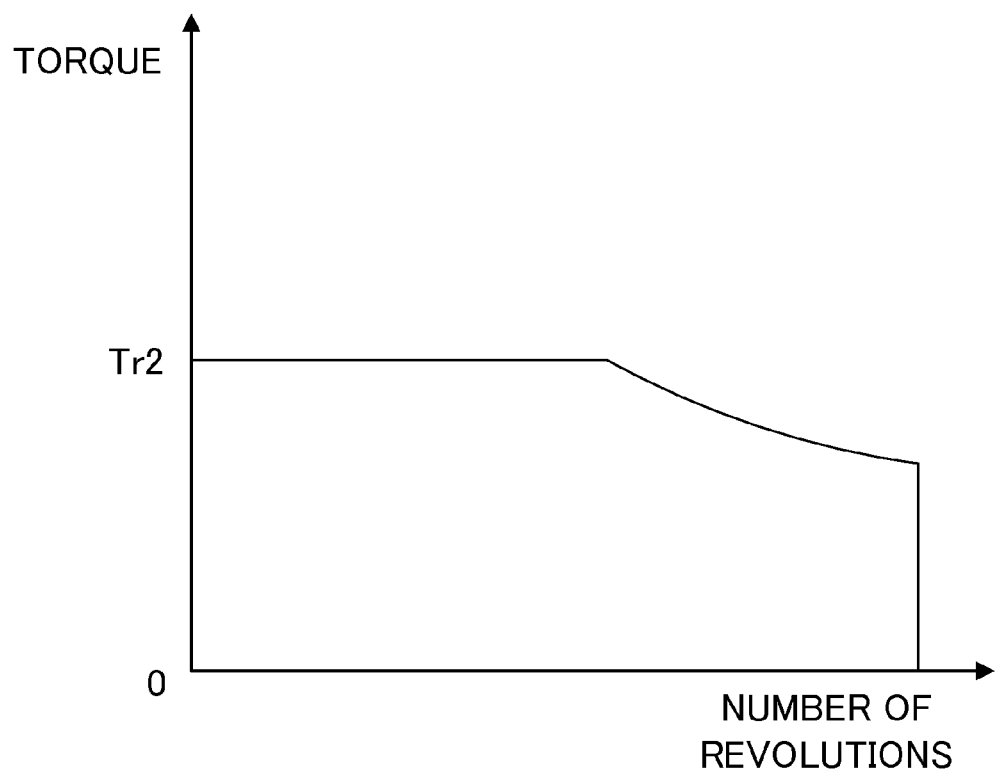
FIG. 6 is a graph illustrating a relation between the torque and the number of revolutions of the motor generator considered to have the second characteristic.

Next, two characteristics that can be realized by the aforementioned motor generator MG will be explained with reference to FIG. 3 to FIG. 6. FIG. 3 is an enlarged cross sectional view illustrating a configuration of the rotors during a first characteristic. FIG. 4 is an enlarged cross sectional view illustrating a configuration of the rotors during a second characteristic. FIG. 5 is a graph illustrating a relation between torque and the number of revolutions of the motor generator considered to have the first characteristic. FIG. 6 is a graph illustrating a relation between the torque and the number of revolutions of the motor generator considered to have the second characteristic.

In FIG. 3 and FIG. 4, the motor generator MG according to the embodiment is provided with a first rotor 610 and a second rotor 620, which are divided in a rotating shaft direction. First rotor cavities 615 are formed in the first rotor 610, and second rotor cavities 625 are formed in the second rotor 620.

In particular, the motor generator MG according to the embodiment can realize the two characteristics, which are different from each other, by changing a relative phase (or rotation angle) of the first rotor 610 and the second rotor 620. Specifically, as illustrated in FIG. 3, if the first rotor 610 and the second rotor 620 have relatively the same phase, the motor generator MG is considered to have the first characteristic. On the other hand, as illustrated in FIG. 4, if the first rotor 610 and the second rotor 620 have relatively different phases (refer to a positional relation between the first rotor cavities 615 and the second rotor cavities 625), the motor generator MG is considered to have the second characteristic. Such a characteristic change is caused by a change in magnetic field characteristics of the motor generator MG.

In FIG. 5, the first characteristic in which the first rotor 610 and the second rotor 620 have relatively the same phase is such a characteristic that maximum rated torque Tr1 of the motor generator MG is set as an output upper limit, and is realized, for example, at the start of the vehicle in which relatively large torque is required, or in similar cases. The torque Tr1 here is one example of the "first predetermined torque" according to the present invention.

In FIG. 6, the second characteristic in which the first rotor 610 and the second rotor 620 have relatively different phases is such a characteristic that torque Tr2, which is smaller than the maximum rated torque Tr1, is set as the output upper limit, and is realized, for example, during high-speed running in which relatively high rotation is required but large torque is not required, or in similar cases. The torque Tr2 here is one example of the "second predetermined torque" according to the present invention.

The torque Tr1 may not be the maximum rated torque if having a larger value than that of the torque Tr2. Even in such a case, a technical effect according to the embodiment described later is properly exerted. The torque Tr1, however, preferably has as a large value as possible in order to remarkably exert the effect according to the embodiment described later.

Moreover, here, an explanation is given to the case where the first characteristic in which the relatively large torque Tr1 is set as the output upper limit is realized if the first rotor 610 and the second rotor 620 have relatively the same phase and where the second characteristic in which the relatively small torque Tr2 is set as the output upper limit is realized if the first rotor 610 and the second rotor 620 have relatively different phases. The relative phase and the characteristics, however, may have an opposite relation. In other words, the second characteristic in which the relatively small torque Tr2 is set as the output upper limit may be realized if the first rotor 610 and the second rotor 620 have relatively the same phase, and the first characteristic in which the relatively large torque Tr1 is set as the output upper limit may be realized if the first rotor 610 and the second rotor 620 have relatively different phases.

The switching of the characteristic of the motor generator MG can be also realized by rotors divided not in the rotating shaft direction as described above but in a circumferential direction. Moreover, the switching of the characteristic of the motor generator MG may be also realized without using the change in the relative phase of the divided rotors. For example, if the rotor(s) is provided with a plurality of different winding wires, changing a winding wire to be used also makes it possible to change between the characteristics. The characteristic of the motor generator MG may not necessarily depend on the magnetic field characteristics as in the embodiment.

As described above, the motor generator MG according to the embodiment can realize the plurality of characteristics in which the output upper limits of the torque are different from each other. It is thus possible to increase operation efficiency of the motor generator MG by switching between the characteristics of the motor generator MG, as occasion demands, according to a running state of the hybrid vehicle 1.

The hybrid vehicle 1 according to the embodiment is provided with the two moor generators MG1 and MG2; however, not both of the motor generators need to be able to switch between the characteristics. If at least one of the motor generators can switch between the characteristics, the technical effect according to the embodiment described later can be obtained.

<Apparatus Configuration>

Figure 7:
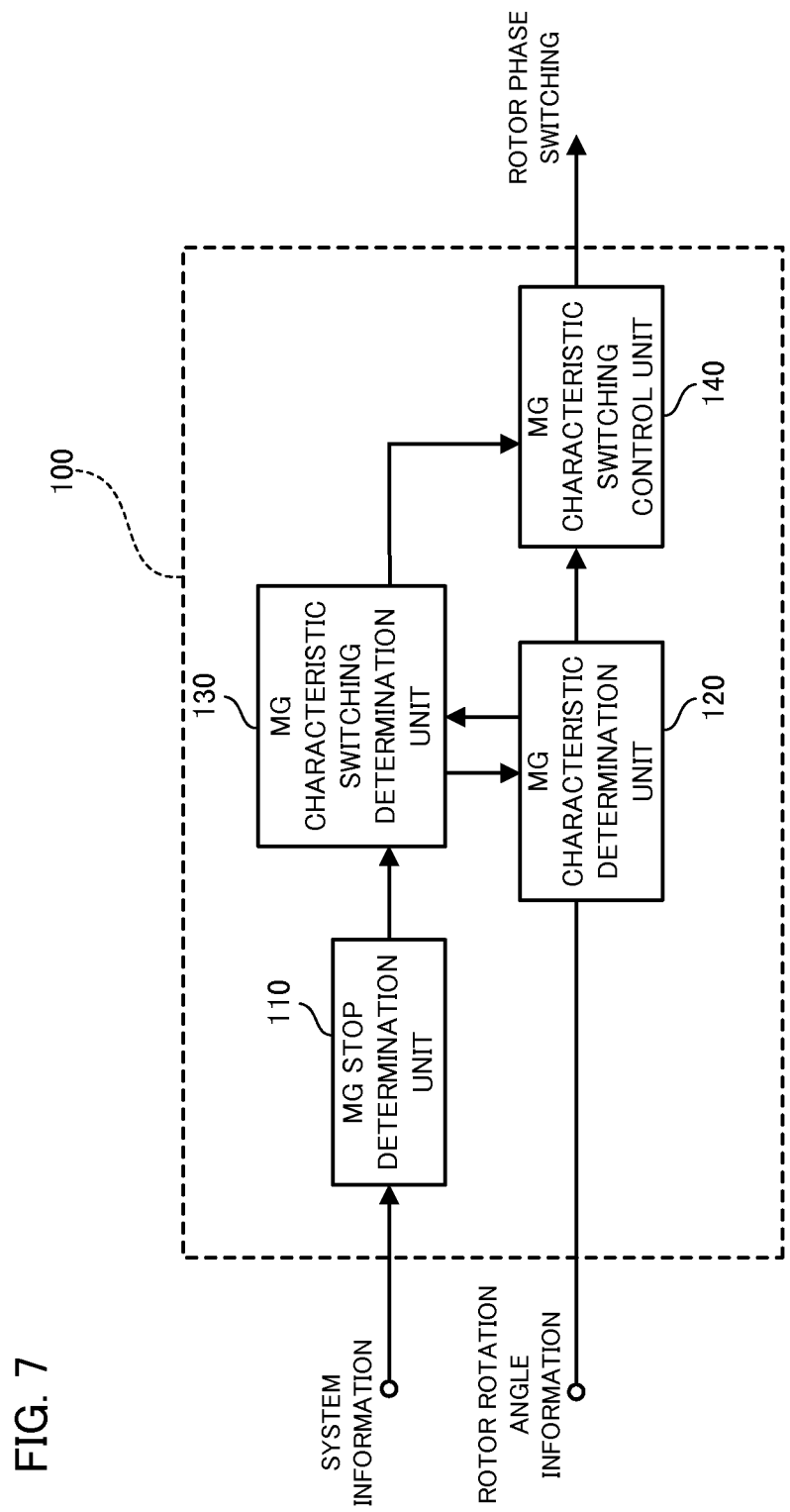
FIG. 7 is a block diagram illustrating a configuration of an ECU.

Next, a specific configuration of the ECU 100, which is one example of the control apparatus for the vehicle motor according to the embodiment, will be explained with reference to FIG. 7. FIG. 7 is a block diagram illustrating the configuration of the ECU according to the embodiment. FIG. 7 illustrates only an element(s) that is deeply related to the embodiment, out of elements included in the ECU 100, and illustration of the other elements is omitted, as occasion demands.

In FIG. 7, the ECU 100 according to the embodiment is provided with a MG stop determination unit 110, a MG characteristic determination unit 120, a MG characteristic switching determination unit 130, and a MG characteristic switching control unit 140.

The MG stop determination unit 110 determines that the motor generator MG in operation is stopped. Specifically, the MG stop determination unit 110 is inputted with information indicating a state of a system of the hybrid vehicle 1, and determines that the motor generator MG is stopped if the system is set to be OFF. The MG stop determination unit 110, however, may use another method to determine that the motor generator MG is stopped. For example, in the configuration in FIG. 2, in the case of a running state in which the number of revolutions of the engine 200 and the number of revolutions of the motor generator MG1 match with each other, or in a case where a crankshaft 205 of the engine 200 and an input shaft of the motor generator MG1 are coaxially located and the number of revolutions of the engine 200 and the number of revolutions of the moor generator MG1 always match with each other, the MG stop determination unit 110 can determine that the motor generator MG1 is stopped when the number of revolutions of the engine 200 is zero. Moreover, the MG stop determination unit 110 can determine that the motor generator MG2 corresponding to the drive shaft 500 in the number of revolutions is stopped when the vehicle speed is zero. Alternatively, the MG stop determination unit 110 may use a sensor configured to directly detect the number of revolutions of the motor generator MG, or the like, to determine the stop. A result of the determination by the MG stop determination unit 110 is outputted to the MG characteristic determination unit 120.

The MG characteristic determination unit 120 is one example of the "characteristic determining device" of the present invention, and determines a present characteristic of the motor generator MG. The MG characteristic determination unit 120 is inputted with information indicating the rotation angles of the rotors of the motor generator MG. The MG characteristic determination unit 120 determines the characteristic of the motor generator MG on the basis of a phase difference between the rotation angles of the first rotor 610 and the second rotor 620. If the characteristic of the motor generator MG is determined in another method other than the phase difference between the rotors, the MG characteristic determination unit 120 may be configured to be inputted with another information for determining the characteristic. A result of the determination by the MG characteristic determination unit 120 is outputted to the MG characteristic switching control unit 140. Moreover, if the characteristic is determined as per an instruction of the MG characteristic switching determination unit 130, the determination result is also outputted to the MG characteristic switching determination unit 130.

The MG characteristic switching determination unit 130 is one example of the "characteristic controlling device" of the present invention, and allows the MG characteristic determination unit 120 to determine whether or not the characteristic of the motor generator MG is the first characteristic (i.e. whether or not the maximum rated torque Tr1 can be outputted). As a result of the determination, if the characteristic of the stopped moor generator MG is not the first characteristic, the MG characteristic switching determination unit 130 instructs the MG characteristic switching control unit 140 to switch the characteristic to the first characteristic and to maintain the first characteristic until the next start of the motor generator MG. In the embodiment, the characteristic other than the first characteristic is only the second characteristic because an explanation is given to the case where the two characteristics, which are the first characteristic and the second characteristic, can be realized. Even if, however, another characteristic (e.g. a third characteristic in which torque Tr3, which is smaller than the maximum rated torque Tr1 but is larger than the torque Tr2, is set as the output upper limit, or a fourth characteristic in which torque Tr4, which is smaller than the torque Tr2, is set as the output upper limit) can be realized, the characteristic may be switched to the first characteristic (i.e. the characteristic having the highest output upper limit).

The MG characteristic switching control unit 140 is one example of the "characteristic switching device" of the present invention, and can switch between the characteristics of the motor generator MG by changing the relative phase of the first rotor 610 and the second rotor 620, as explained with reference to FIG. 3 to FIG. 6. The MG characteristic switching control unit 140 performs characteristic switching control in which the operation efficiency of the motor generator MG is increased according to the characteristic of the motor generator MG determined on the MG characteristic determination unit 120, a parameter that is inputted from each part of the vehicle and that indicates a running situation, or the like, for example, during running of the hybrid vehicle 1. If, however, the characteristic switching is performed during the stop of the hybrid vehicle 1 as described above, the MG characteristic switching control unit 140 switches the characteristic of the motor generator MG to the first characteristic as per the instruction of the MG characteristic switching determination unit 130.

The ECU 100 including the aforementioned respective parts is an integrally-configured electronic control unit, and is configured in such a manner that the operations associated with the aforementioned respective parts are all performed by the ECU 100. Physical, mechanical, and electrical configurations of the aforementioned parts according to the present invention, however, are not limited to this example. For example, the respective parts may be configured as various computer systems such as a plurality of ECU, various processing units, or various controllers or microcomputer apparatuses.

<Explanation of Operation>

Figure 8:
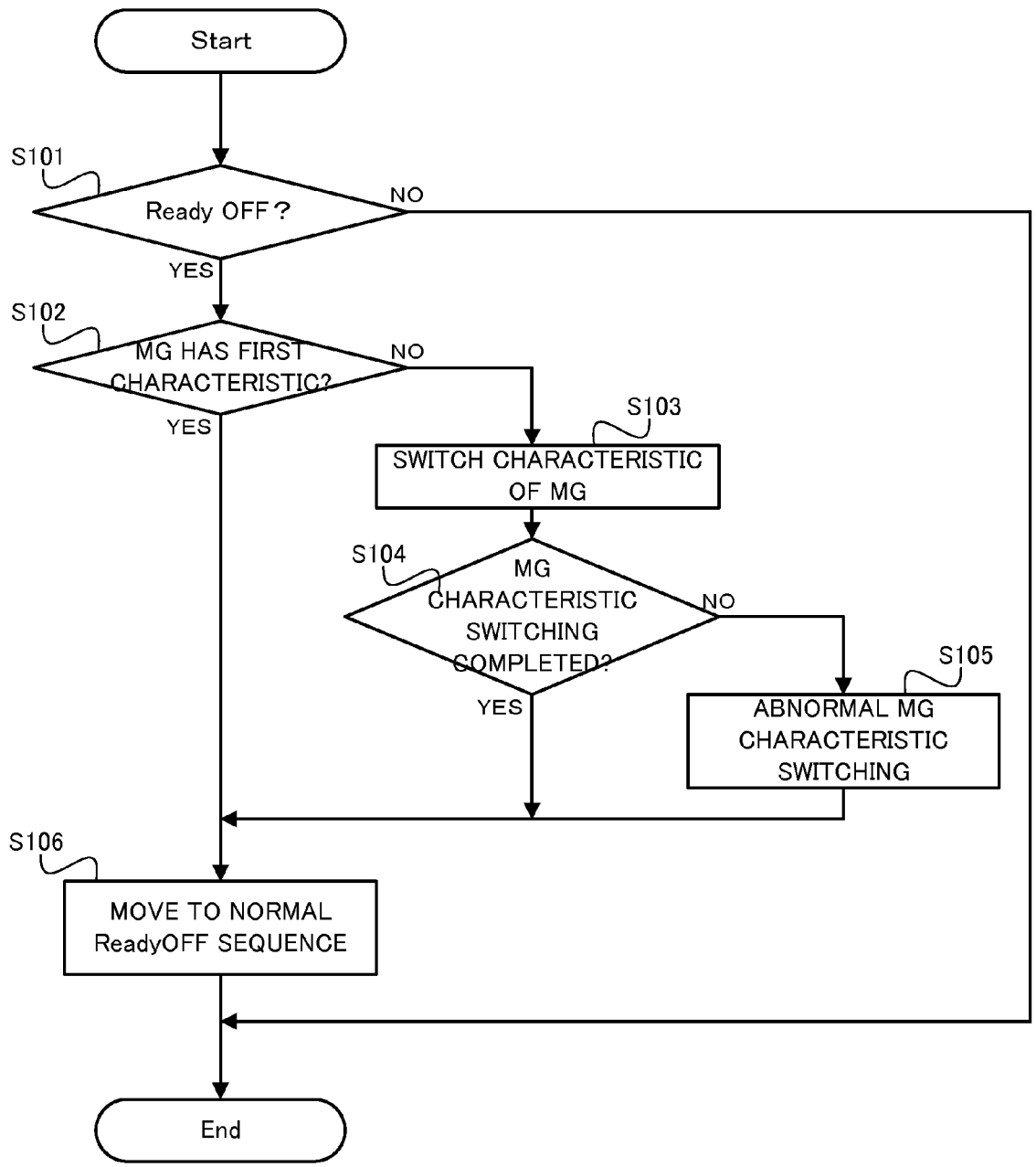
FIG. 8 is a flowchart illustrating operation of the control apparatus for the vehicle motor according to the embodiment.

Next, operation of the control apparatus for the vehicle motor according to the embodiment will be explained with reference to FIG. 8. FIG. 8 is a flowchart illustrating the operation of the control apparatus for the vehicle motor according to the embodiment. Hereinafter, out of all the processes performed by the control apparatus for the vehicle motor according to the embodiment, a characteristic switching process at the stop of the vehicle, which is unique to the embodiment, will be explained in detail, and the explanation of the other general processes will be omitted, as occasion demands.

In FIG. 8, in operation of the control apparatus for the vehicle motor according to the embodiment, firstly, on the MG stop determination unit 110, it is determined whether or not a system off command is issued to the hybrid vehicle 1 (step S101). If it is determined that the system off command is issued to the hybrid vehicle 1 (the step S101: YES), an instruction is given from the MG characteristic switching determination unit 130 to the MG characteristic determination unit 120 to determine whether or not the characteristic of the motor generator MG is the first characteristic (step S102). In other words, if the system off command is issued, it is determined that the operation of the motor generator MG is stopped, and it is determined whether or not to perform the characteristic switching control at the stop of the vehicle.

The characteristic of the motor generator MG is determined not only at the stop of the operation described above, but also at another timing during the operation. For example, which characteristic the motor generator MG has is determined by the MG characteristic determination unit 120 regularly with a predetermined period, or at predetermined timing such as immediately after implementation of the characteristic switching control. This makes it possible to accurately know the present characteristic of the motor generator MG and to perform appropriate control according to the characteristic.

Figure 9:
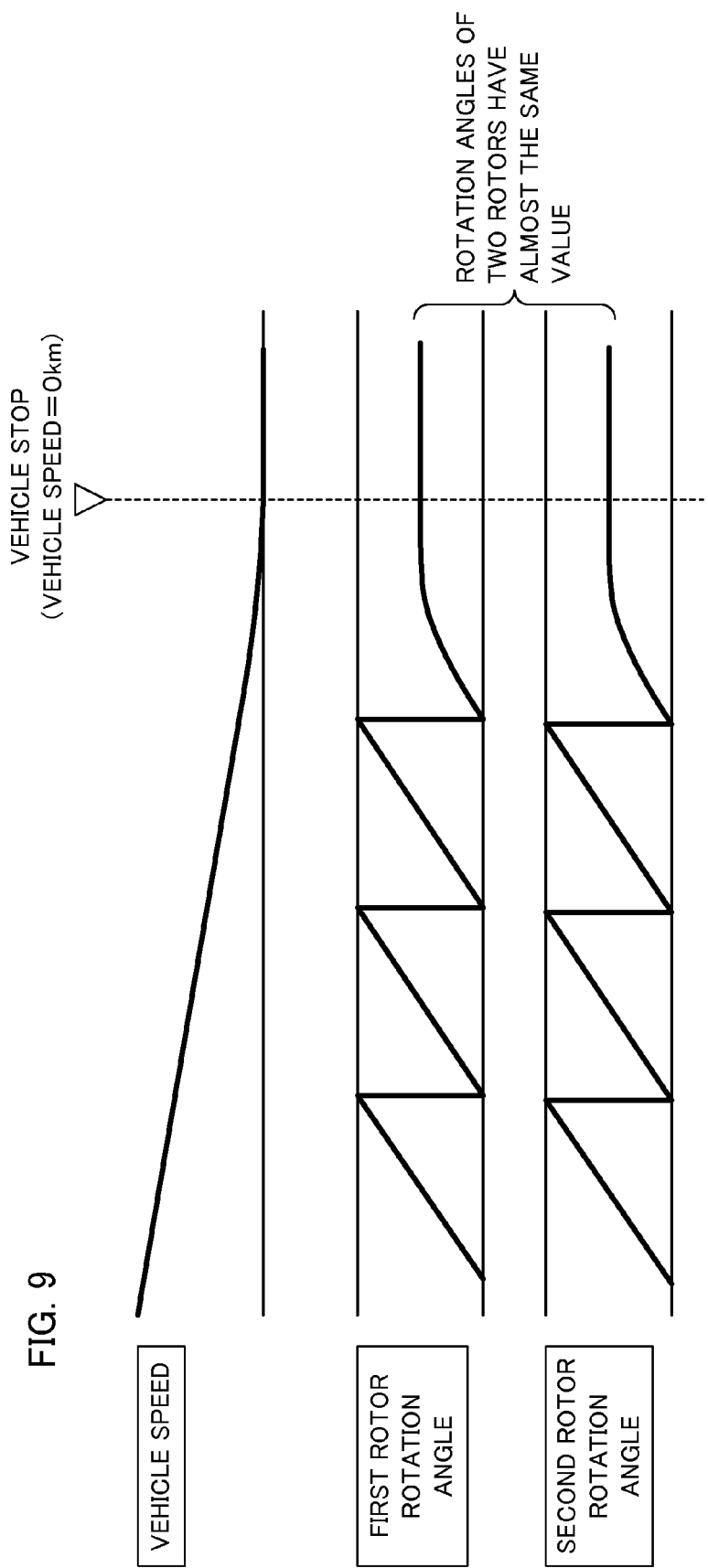
FIG. 9 is a time chart illustrating the operation of the motor generator considered to have the first characteristic at the stop of the vehicle.
Figure 10:
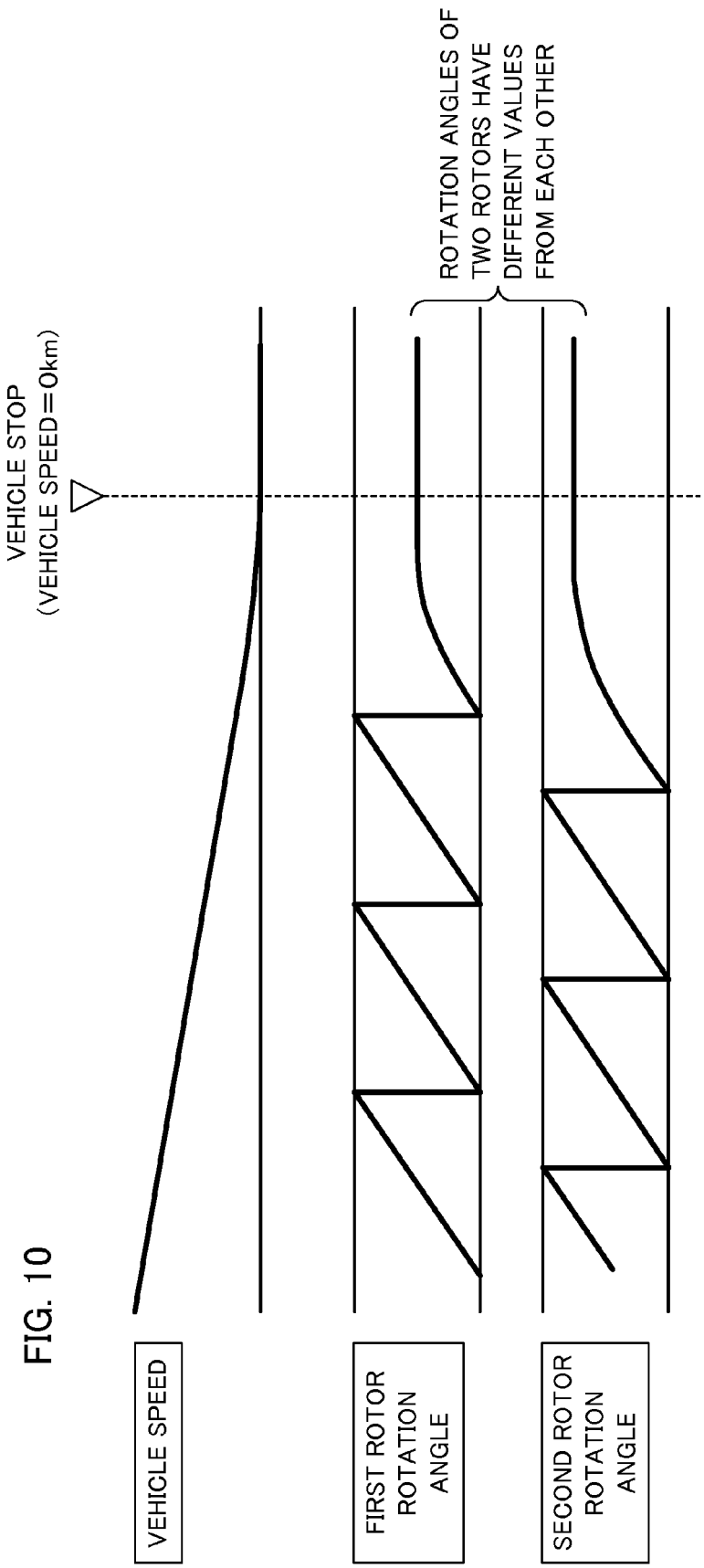
FIG. 10 is a time chart illustrating the operation of the motor generator considered to have the second characteristic at the stop of the vehicle.

Hereinafter, a method of determining the characteristic of the motor generator MG will be explained, more specifically, with reference to FIG. 9 and FIG. 10. FIG. 9 is a time chart illustrating the operation of the motor generator considered to have the first characteristic at the stop of the vehicle. FIG. 10 is a time chart illustrating the operation of the motor generator considered to have the second characteristic at the stop of the vehicle.

In FIG. 9, if the characteristic of the motor generator MG immediately before the stop is the first characteristic, the rotation angles of the first rotor 610 and the second rotor 620 during the running of the hybrid vehicle 1 change in such a manner that the rotation angles have the same phase with the same period. Thus, even if the hybrid vehicle 1 is stopped, the rotation angles of the first rotor 610 and the second rotor 620 change in the same manner, and the rotors are stopped with substantially the same value. Therefore, if the first rotor 610 and the second rotor 620 have the same rotation angle after the stop of the hybrid vehicle 1, it can be determined that the characteristic of the motor generator MG is the first characteristic.

In FIG. 10, if the characteristic of the motor generator MG immediately before the stop is the second characteristic, the rotation angles of the first rotor 610 and the second rotor 620 during the running of the hybrid vehicle 1 change in such a manner that the rotation angles change with the same period but have relatively different phases. Thus, even if the hybrid vehicle 1 is stopped, the rotation angles of the first rotor 610 and the second rotor 620 change with the values different from each other, and the rotors are stopped with the values different from each other. Therefore, if the first rotor 610 and the second rotor 620 have the rotation angles different from each other after the stop of the hybrid vehicle 1, it can be determined that the characteristic of the motor generator MG is the second characteristic.

Moreover, the characteristic can be also determined on the basis of the latest situation of the motor generator, not directly from the rotation angles of the rotors as described above. For example, the motor generator MG outputs stop torque in order to stop the vehicle in some cases, and the stop torque is required to be relatively large due to the nature thereof. Thus, the motor generator MG that outputs the stop torque is considered to have the first characteristic in which the relatively large torque can be outputted. Therefore, if the motor generator MG outputs the stop torque in order to stop the vehicle, it can be determined that the characteristic of the motor generator MG is the first characteristic even without the detection of the rotation angles of the rotors described above. In other words, even if a process for determining the characteristic of the motor generator MG is not separately performed, the characteristic can be determined depending on whether or not the motor generator MG outputs the stop torque.

Back in FIG. 8, the result of the determination of the characteristic at the stop of the operation is outputted from the MG characteristic determination unit 120 to the MG characteristic switching determination unit 130. Then, if it is determined that the characteristic of the motor generator MG is not the first characteristic (the step S102: NO), an instruction is given from the MG characteristic switching determination unit 130 to the MG characteristic switching control unit 140 so as to switch the characteristic of the motor generator MG to the first characteristic. This allows the MG characteristic switching control unit 140 to perform such control that enables the phases of the first rotor 610 and the second rotor 620 to relatively match with each other, by which the first characteristic is realized (step S103). Moreover, an instruction is also given from the MG characteristic switching determination unit 130 to the MG characteristic switching control unit 140 to maintain the first characteristic after the switching, until the next start of the motor generator MG. By this, the stopped motor generator MG is started with the first characteristic at the next start.

It is required to maintain the characteristic of the motor generator MG in the system off state, as described above. Thus, the motor generator MG according to the embodiment is preferably configured in such a manner that electric power is not required to maintain the characteristic. As a specific example in which the electric power is not required to maintain the characteristic, there are exemplified a rotor of a variable magnetic force type by electric current control, and a rotor of a rotor division type, or the like.

More specifically, in the rotor division type, for example, if the first characteristic is realized, N-N poles match with each other and S-S poles match with each other between the divided rotors. Thus, respective repulsive forces of the poles balance with each other, and the rotors do not move. If, however, the second characteristic is realized, N-S poles match with each other and S-N poles match with each other between the divided rotors. Thus, the poles are attached to each other due to respective magnetic forces, and the rotors do not move. As a result, in the rotor division type, the characteristic is maintained even if the system off is set and electrification or energization is not carried out.

On the other hand, in the variable magnetic force type, a variable magnet (e.g. a samarium cobalt magnet, an alnico magnet, etc.) in which magnetic force is changed by the electric current control is used for magnetic force varying control. Once current is supplied and a magnetic field is generated, latest magnetic force is maintained unless current is supplied to change the magnetic field again. Thus, in the variable magnetic force type, the characteristic is maintained even if the system off is set and electrification or energization is not carried out.

Here, the switching of the characteristic of the motor generator MG as described above cannot be performed in some cases due to an unexpected failure or the like. In this case, since the characteristic of the motor generator MG is fixed to one characteristic, efficient operation by the characteristic switching as described above is hardly performed. Moreover, if the characteristic of the motor generator MG is fixed to the second characteristic, the output of the torque is limited to the torque Tr2, and there is thus a possibility that the hybrid vehicle 1 cannot preferably run. Specifically, there is a possibility that the hybrid vehicle 1 cannot be appropriately started from a stop state, or that acceleration/deceleration desired by a driver cannot be realized. Moreover, unstable behavior of the hybrid vehicle 1 possibly makes it hard to ensure safety.

In contrast, in the embodiment, as described above, the characteristic is set to the first characteristic if the motor generator MG is stopped, and the motor generator MG is started with the first characteristic at the next start. Thus, even if the characteristic switching cannot be performed during the stop, the motor generator MG can output the maximum rated torque Tr1. It is therefore possible to preferably avoid the disadvantage caused by the insufficient output torque as described above.

According to the study of the present inventors, it has been found that a defect related to the characteristic switching control tends to occur more often as the motor generator MG is stopped for a longer time. Thus, if the switching control to the first characteristic is not performed at each time of the stop of the motor generator MG but the switching control to the first characteristic is performed only if the motor generator MG is stopped for a rather long time, it is then possible to more efficiently avoid the defect. Even in view of this point, the embodiment in which it is determined whether or not to perform the characteristic switching control when the system of the hybrid vehicle 1 is set to be OFF can be said to be an extremely preferably form.

In the control apparatus for the vehicle motor according to the embodiment, after the characteristic switching control is performed, it is further determined whether or not the characteristic switching control is successfully completed (step S104). Specifically, in the MG characteristic determination unit 120, it is determined again whether or not the characteristic of the motor generator MG is the first characteristic. Here, if it is determined that the characteristic of the motor generator MG is not the first characteristic even though the characteristic switching control is performed (the step S104: NO), it is determined that the characteristic switching control is not successfully performed (step S105).

Hereinafter, the characteristic switching control of the motor generator MG and the determination of the characteristic performed before and after the characteristic switching control will be explained, more specifically, with reference to FIG. 11. FIG. 11 is a time chart illustrating the operation when the characteristic of the motor generator is switched from the second characteristic to the first characteristic.

As illustrated in FIG. 11, if there is a difference in the relative phase of the first rotor 610 and the second rotor 620 in the determination before the characteristic switching control (i.e. in the step S102), it can be determined that the characteristic of the motor generator MG is the second characteristic. In such a case, as illustrated in a region surrounded by a dashed line in FIG. 11, such control that enables the rotation angle of the second rotor 620 to match the rotation angle of the first rotor 610 is performed to switch the characteristic of the motor generator MG. Instead of this control, such control that enables the rotation angle of the first rotor 610 to match the rotation angle of the second rotor 620 may be also performed. Alternatively, the first rotor 610 and the second rotor 620 may be controlled to have rotation angles that match with each other.

In the example illustrated in FIG. 11, the rotation angle of the first rotor 610 and the rotation angle of the second rotor 620 have the same value in the determination after the characteristic switching control (i.e. in the step S105), and the difference in the relative phase is solved. It can be thus determined that the characteristic of the motor generator MG is successfully switched to the first characteristic. If there is the difference in the relative phase of the first rotor 610 and the second rotor 620 (i.e. if the characteristic other than the first characteristic remains) even after the characteristic switching control, it is considered that the characteristic switching cannot be successfully performed, for example, due to a failure of a switching mechanism or the like. With respect to such an abnormality, it is sufficient only to determine that there is an abnormality, as described above, but some process that solves the abnormality may be also performed. Alternatively, the characteristic switching control may be also performed again.

Back in FIG. 8, if it is determined that the characteristic is already the first characteristic in the determination before the characteristic switching control (the step S102: YES), or if it is determined that the control is successfully completed after the characteristic switching control (the step S104: YES), or if it is determined that there is an abnormality in the characteristic switching control (the step S105), a process upon normal system off is started (step S106). By this, a series of process operations by the control apparatus for the vehicle motor according to the embodiment is ended.

As explained above, according to the control apparatus for the vehicle motor in the embodiment, in addition to the normal characteristic switching control for the motor generator MG, the characteristic is switched to the first characteristic in which the maximum rated torque Tr1 can be outputted, if the motor generator MG is stopped. This makes it possible to prevent the insufficient output torque even if the characteristic switching control cannot be successfully performed, thereby realizing appropriate running.

The present invention is not limited to the aforementioned embodiment, but various changes may be made, if desired, without departing from the essence or spirit of the invention which can be read from the claims and the entire specification. A control apparatus for a vehicle motor which involves such changes is also intended to be within the technical scope of the present invention.

DESCRIPTION OF REFERENCE NUMERALS AND LETTERS

1 hybrid vehicle
10 hybrid drive apparatus
11 PCU
12 battery
13 accelerator opening sensor
14 vehicle speed sensor
100 ECU
110 MG stop determination unit
120 MG characteristic determination unit
130 MG characteristic switching determination unit
140 MG characteristic switching control unit
200 engine
310 MG1-side power transmission mechanism
320 MG2-side power transmission mechanism
410 damper
420 input shaft
500 drive shaft
610 first rotor
615 first rotor cavity
620 second rotor
625 second rotor cavity
MG1, MG2 motor generator

The invention claimed is:

1. A control apparatus for a vehicle motor, configured to control a motor that can realize a plurality of characteristics in which output upper limits of torque are different from each other, said control apparatus for the vehicle motor comprising:
    a characteristic switching device configured to switch a characteristic of the motor between a first characteristic in which the output upper limit is first predetermined torque and a second characteristic in which the output upper limit is second predetermined torque, which is smaller than the first predetermined torque;
    a characteristic determining device configured to determine whether the characteristic of the motor is the first characteristic or the second characteristic; and
    a characteristic controlling device configured to allow said characteristic determining device to determine whether or not the characteristic of the motor is the first characteristic if a driven body driven by the motor is stopped, and configured to control said characteristic switching device to switch the characteristic of the motor to the first characteristic and to start the motor with the first characteristic at a next start of the driven body if it is determined that the characteristic of the motor is not the first characteristic.

2. The control apparatus for the vehicle motor according to claim 1, wherein the first predetermined torque is maximum torque that can be outputted by the motor.

3. The control apparatus for the vehicle motor according to claim 2, wherein said characteristic controlling device allows said characteristic determining device to determine whether or not the characteristic of the motor is the first characteristic if the driven body is stopped for a predetermined period or more.

4. The control apparatus for the vehicle motor according to claim 1, wherein said characteristic determining device determines that the characteristic of the motor is the first characteristic if the motor outputs stop torque for stopping the driven body.

5. The control apparatus for the vehicle motor according to claim 1, wherein said characteristic controlling device allows said characteristic determining device to determine whether or not the characteristic of the motor is the first characteristic after a command of system off of a vehicle on which the motor is mounted.

6. The control apparatus for the vehicle motor according to claim 1, wherein
    the motor is provided in such a manner that the motor corresponds to a drive shaft of a vehicle on which the motor is mounted, in number of revolutions, and
    said characteristic controlling device allows said characteristic determining device to determine whether or not the characteristic of the motor is the first characteristic if a speed of the vehicle becomes zero.

7. The control apparatus for the vehicle motor according to claim 1, wherein
    the motor is provided in such a manner that the motor corresponds to an internal combustion engine of a vehicle on which the motor is mounted, in number of revolutions, and
    said characteristic controlling device allows said characteristic determining device to determine whether or not the characteristic of the motor is the first characteristic if the number of revolutions of the internal combustion engine becomes zero.

\* \* \* \* \*